United States Patent [19]

Glazier

[11] 4,249,424

[45] Feb. 10, 1981

[54] VARIABLE THROW ECCENTRIC

[76] Inventor: William J. Glazier, 237 Harbour Ave., North Vancouver, British Colombia, Canada, V7J 2E8

[21] Appl. No.: 931,411

[22] Filed: Aug. 7, 1978

[30] Foreign Application Priority Data

Nov. 23, 1977 [CA] Canada .................................. 291545

[51] Int. Cl.³ ........................ F16H 21/42; F16H 29/04
[52] U.S. Cl. ........................................ 74/25; 74/117; 74/571 R; 74/835; 74/836
[58] Field of Search ................ 74/25, 61, 570, 571 R, 74/571 L, 571 M, 835, 836, 117, 124, 119

[56] References Cited

U.S. PATENT DOCUMENTS

| | | | |
|---|---|---|---|
| D. 191,415 | 9/1961 | Hopkins | D15/149 |
| 321,117 | 6/1885 | Landis | 74/571 R |
| 540,394 | 6/1895 | Leitch | 74/571 R |
| 858,049 | 6/1907 | Ziegler | 74/119 |
| 968,482 | 8/1910 | Kraeger | 74/119 |
| 969,140 | 8/1910 | Fowler | 74/119 |
| 1,268,832 | 6/1918 | Furber | 74/25 |
| 1,526,629 | 2/1925 | Collins | 74/571 R |
| 2,005,227 | 6/1935 | Johnson | 74/117 |
| 2,051,783 | 8/1936 | Dake | 74/117 |
| 2,254,195 | 8/1941 | Cicin | 74/119 |
| 2,521,711 | 9/1950 | Galliano | 74/571 L |
| 2,534,093 | 12/1950 | Willard | 74/119 X |
| 2,568,937 | 9/1951 | Stueland | 74/117 X |
| 2,691,896 | 10/1954 | Stageberg | 74/119 |
| 2,692,510 | 10/1954 | Gille | 74/119 |
| 2,997,888 | 8/1961 | Rust, Jr. | 74/119 |
| 3,206,991 | 9/1965 | Lines et al. | 74/119 X |
| 3,861,485 | 1/1975 | Busch | 74/689 X |

FOREIGN PATENT DOCUMENTS

| | | |
|---|---|---|
| 708369 | 4/1965 | Canada . |
| 300835 | 11/1928 | United Kingdom . |
| 357046 | 9/1931 | United Kingdom . |
| 538230 | 7/1941 | United Kingdom . |
| 1271190 | 4/1972 | United Kingdom . |
| 1360123 | 7/1974 | United Kingdom . |
| 1404403 | 8/1975 | United Kingdom . |

OTHER PUBLICATIONS

Publication of Maschinen Fabrik-Rudolph Hauserr & Sohne-Sprockhovez, West Germany-Nov. 1977.
Publication of Link-Belt (A Division of Rexnord Inc.), Milwaukee, Wis.

Primary Examiner—James Kee Chi

[57] ABSTRACT

The invention achieves a method and a device for providing infinitely variable adjustment to the throw of an eccentric from zero to a maximum while the eccentric is permitted to continuously travel in angular motion. This is achieved by two juxtaposed and eccentric members mounted on a drive shaft, one (the outer) overriding, the other (the inner). The eccentric members may be relatively positioned by a control shaft, which extends coaxially through the drive shaft, and gearingly mates with the outer eccentric member. The outer surface of the outer eccentric can be arranged (by relatively positioning the outer and inner eccentric members) to trace the loci of points of a circle, whereupon no reciprocation takes place, or of a family of ellipses of varying eccentricity, whereby reciprocation is achieved in correspondence to the relative eccentricity in the path of travel of the outer surface.

10 Claims, 8 Drawing Figures

VARIABLE THROW ECCENTRIC

This invention relates to a variable throw eccentric.

Those skilled in the art will know that eccentrics are commonly used to convert rotary motion into reciprocating motion or vice versa. There are generally two types of eccentrics, fixed or variable eccentrics. The latter permit regulation of the amplitude of reciprocation. Such changes in amplitude are achieved by locking the relative position of the members to establish the eccentricity for reciprocation; the means to accomplish this is normally achieved by pins, locks or bolts.

There are certain applications, for example, the transmission of power, where it is desirable to alter the amplitude of reciprocation while the eccentric is in continuous rotary or angular motion. In such applications existing variable throw eccentrics are not acceptable.

Thus the invention achieves a method and a device for providing an infinitely variable adjustment to the throw of an eccentric from zero to a maximum while the eccentric travels in continuous angular motion tracing a path of that of circle, at zero; or through a family of elipses of varying eccentricity to a maximum.

The potential use of such dynamically variable throw eccentrics will be obvious to those skilled in the art. For example, a plurality of dynamically variable throw eccentrics could be harnessed in a variable speed transmission to convert linear motion into rotary motion, or on the other hand, singly, as converters of rotary motion for driving vibrators, shakers and the like.

A further advantage of such method and device is that it provides variable torque to the reciprocating arm, the torque being greatest when the stroke is shortest, decreasing as the stroke increases, thereby providing the greatest torque when most desired.

The invention therefore contemplates, in one aspect, a dynamically variable throw eccentric comprising:
(a) a main drive shaft having a first fixed eccentric member, the shaft extending at one end into an outer spiral thread, while defining a cylindrical recess that extends into the shaft;
(b) a sector defined by the shaft communicating with the recess, the shaft also defining a protuberance as a first eccentric member;
(c) a control shaft residing in the cylindrical recess and extending beyond said end as a spirally threaded shaft;
(d) a movable control sleeve having an inner surface defining a spirally threaded major bore stepping into a spirally threaded minor bore, the threaded major bore threadingly mating with the outer spiral thread of the main shaft and the minor bore threading mating with the spiral threaded control shaft whereby axial movement of the sleeve along the shafts changes, relatively, the angular position of the shafts;
(e) second eccentric member mating with and mounted to travel relative to first eccentric member;
(f) means for communicating the relative angular position of the shafts through the sector and to responsively locate the relative angular positions of the eccentric members in response thereto irrespective of the angular velocity of the main drive shaft.

The invention also contemplates a method of varying dynamically the eccentricity of a rotating member comprising the steps of (a) arranging an outer eccentric member, having an outer surface, to matingly engage the rotating member and to be adapted to be radially positioned relative to the rotating member;
(b) imparting an angular velocity to the rotating member;
(c) changing the relative angular position of the outer eccentric member and the rotating member, to change their relative angular location of the outer surface whereby an imaginary point thereon traces during revolution of the rotating member a path of an elipse whose eccentricity is unique for each relative angular position of the members.

The invention also further contemplates a method of varying dynamically the eccentricity of a rotating member that carries a first fixed eccentric member as a protuberance thereon comprising the steps of:
(a) arranging an outer eccentric member X to have outer surface to surround the fixed eccentric member and to matingly travel thereover;
(b) imparting an angular velocity to the shaft; then,
(c) changing the relative angular positions of the eccentric members to change the relative angular location of the outer surface whereby an imaginary point thereon traces during revolution of the rotating member a path of an elipse whose eccentricity is unique for each relative angular position of the eccentric members.

The invention will now be described by way of example and with reference to the accompanying drawings in which.

Figure 1:
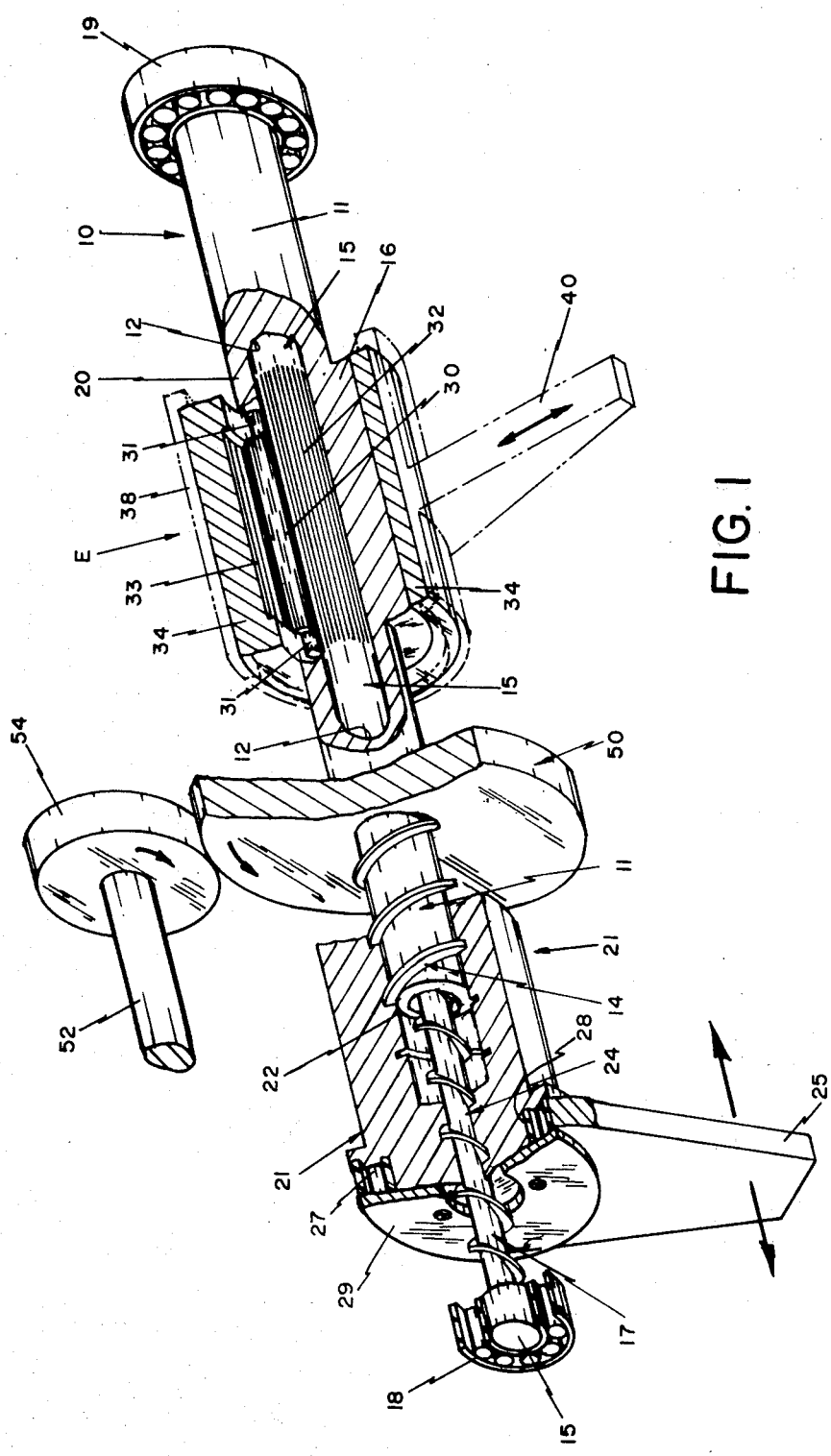
FIG. 1 is an assembly view, partially in section, of an embodiment of the invention.

Referring to FIG. 1 a dynamically variable throw eccentric 10 includes a main (drive) shaft 11 which extends at one end into an outer spiral thread 14. The main shaft has a coaxially positioned inner fore recess 12 which extends from the end into the shaft; a control shaft 15 exists therein. The control shaft 15 has an end which extends or protrudes, beyond the end of the main shaft 11, as a spiral threaded shaft 17. A control sleeve 21 defining a major threaded 22 stepping into a minor threaded bore 24 is provided. The major threaded bore 22 mates with the main shaft threads 14, and the minor threaded bore 24 is provided. The major threaded bore 22 mates with the main shaft threads 14, and the minor threaded bore 24 with the threaded shaft 17. The respective threads of the threaded shafts 17 and 14 are helical fairly long, have the same lead and of opposite hand; that is, each spiral is in the neighbourhood of one revolution to 2" through 6" (5 cm–15 cm) of travel, although the precise pitch is dependent somewhat on shaft diameter. Thus, by adjusting the axial position of the sleeve 21 relative to the shafts, as by positionally locating control sleeve arm 25 which within the range of positions as indicated by the arrows, the relative angular position of the threaded shafts changes. The control arm 25 has a central apertured bearing ring that urges against roller bearings 27 which are placed in an annular recess 28 defined by the sleeve 21. Irrespective of the angular position or velocity of rotation of the drive shaft 11 the control arm 25 can be fixedly held because of the bearing/recess arrangement 27, 28. One end 15 of the threaded control shaft 17 terminates at a bearing 18 which may preferably be a thrust bearing (not shown as such). Likewise the opposite end of the main shaft 11 terminates at a bearing 19.

The main shaft 11 has a region thereof which is integral therewith and is a protuberance that forms an inner eccentric member 16. The inner eccentric member 16 does not completely encapsulate the total perimeter of the main shaft 11. Thus, there is a communicating sector 20 which is defined by the main shaft 11 preferably located at the region of tangental coincidence between the outer circumference of the main shaft 11 and the outer circumference of the fixed inner eccentric 16. This recess or sector 20, shown in FIG. 1, communicates between the inner bore 12 and the outside of the inner eccentric member 16. In the sector 20 an idler gear 30 is mounted and is contained therein by idler shafts 31 secured into the marginal recesses in the wall of the sector 20. A movable outer eccentric member 34 circumferentially mates and is adapted to travel over the outer surface of the inner eccentric 16 and to follow the elliptical path defined by the outside circumference of fixed inner eccentric 16. Along a significant position, at least 180°, of the interior surface of the outer eccentric member 34 gear teeth are machined (rack 33) which mate with the idler gear 30. The idler gear 30, on the other hand, also mates with a corresponding external gear or rack 32 machined or embossed onto the surface of the control shaft 15. The idler gear 30 is shown as having width almost as wide as the eccentric members, although this is not necessary. It is preferred; however, that the idler gear 30 be less than the width with which the outer eccentric member 34 is recessed (see FIG. 1). This maintains the axial allignment or registration of the outer eccentric member 34 on the inner eccentric member 16. Now it will be apparent, that with rotation of the control shaft 15 relative to the main shaft 11, the idler gear 30 will be caused to rotate in the opposite direction thereby driving the outer eccentric 34 along the elliptical path, or locus defined by the outer circumference of the fixed inner eccentric 16. The relative positioning of the eccentrics is independent of angular motion of the main drive shaft 11.

When the drive shaft 11 is rotated reciprocating motion is thus conveyed from the path of travel of the outside surface of the outer eccentric member 34 which if having a depending arm 40 will reciprocate, as shown in phantom in FIG. 1. It will be understood that the housing 38 (see FIG. 8) may be eliminated. In the latter instance, referring to FIG. 8, the reciprocating motion established by the movement of the outer surface of the outer eccentric member could be conveyed to a cam rod 60 which runs over the moving outer surface (of the eccentric member 34).

Figure 2:
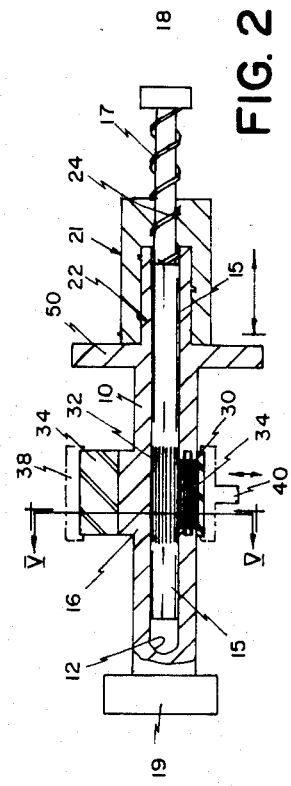
FIGS. 2, 3 and 4 are representative cross section, in elevation, of the working components of the embodiment of FIG. 1.
Figure 3:
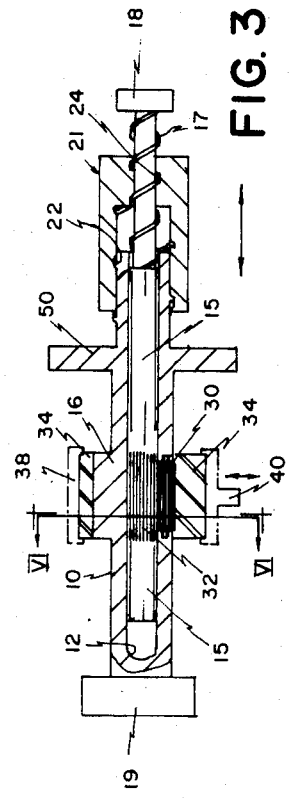
Figure 4:
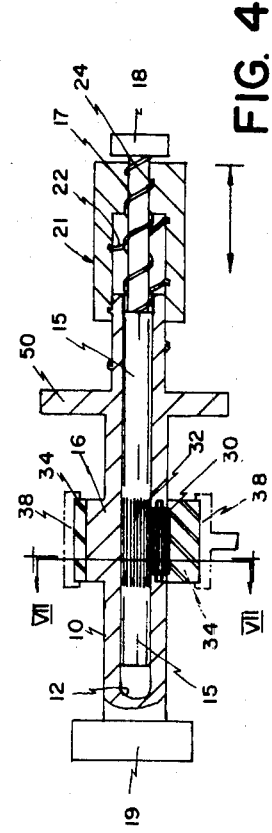
Figure 5:
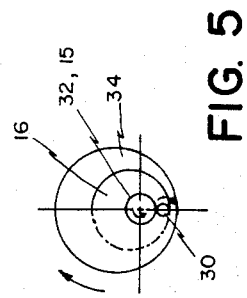
FIGS. 5, 6 and 7 are, respectively, sections along lines V—V, VI—VI and VII—VII of FIGS. 2, 3 and 4.
Figure 6:
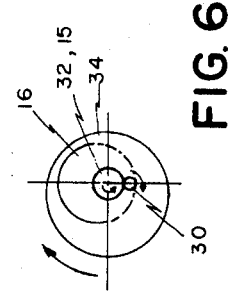
Figure 7:
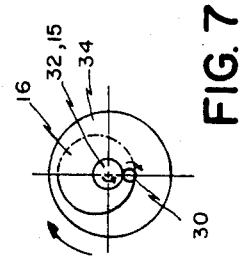

Now as to operation, by referring to FIGS. 2 through 7, a study of those figures will illustrate that when the sleeve 21 is positioned as at FIG. 4, the eccentric members 16 and 34 will assume the positions as at FIGS. 4 and 7; hence the throw will be zero whereupon no reciprocating motion will be conveyed. FIGS. 2 and 5 illustratively indicate the eccentric member in maximum position when the sleeve is moved from the right most position of FIG. 4 to the left most position of FIG. 2. FIGS. 3 and 6 illustrate an intermediate position between maximum and zero. By providing the main shaft with a fixed driving gear 50, which in the incident embodiment is positioned between sleeve 21 and eccentric members 34 and 16, although an alternative position would suffice, the main shaft 11 may be placed into rotation (an angular velocity) by the power drive shaft 52 engaging through the pully gear 54 to the main shaft gear 50. Preferably both gears 50 and 54 have intermessing teeth (not shown).

Figure 8:
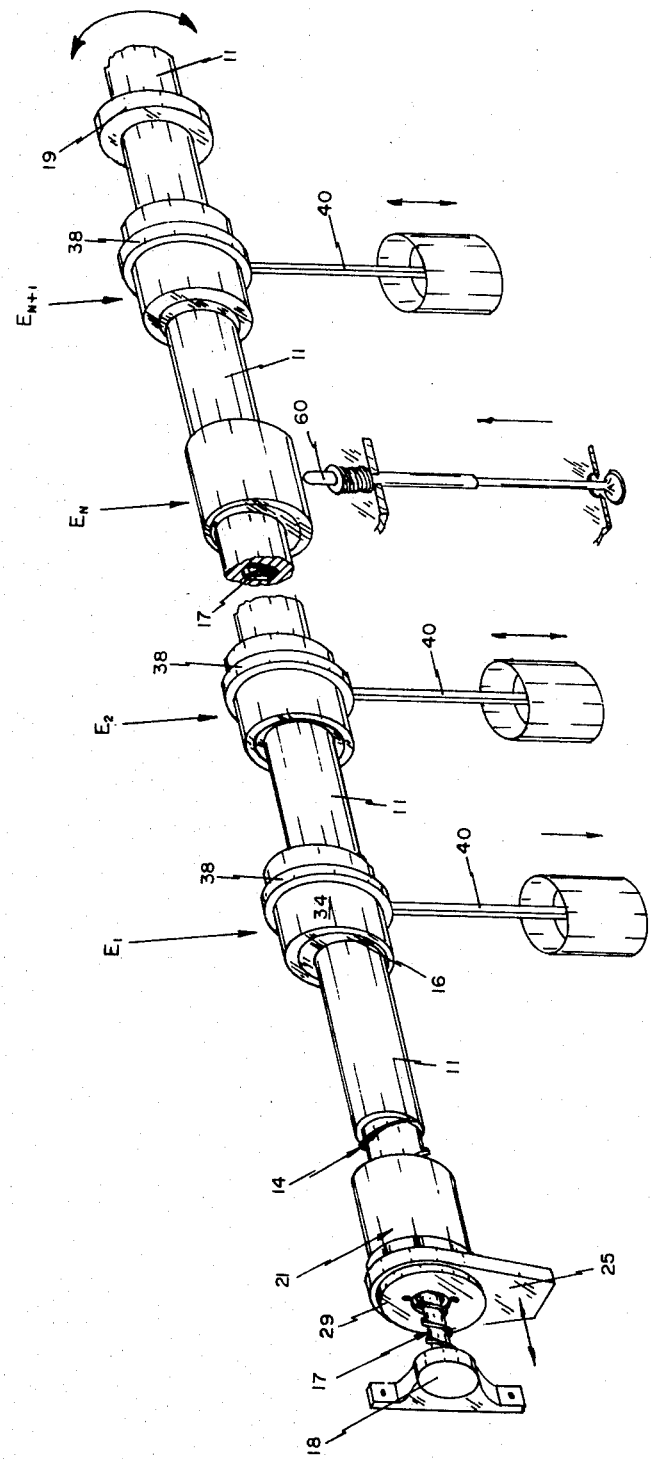
FIG. 8 is a perspective, partially in section of a single shaft employing a plurality of eccentrics.

Referring to FIG. 8 it is clearly seen that a number of sets of eccentric members could be placed on a single shaft and be arranged so as to convey reciprocating motion at different phases, for instance at 90°. Those skilled in the art will appreciate, that such an embodiment is useful in the transmission of power.

The embodiments of the invention in which an exclusive property or privilege is claimed are defined as follows:

1. A dynamically variable throw eccentric comprising:
   (a) a main drive shaft having a first fixed eccentric member, the shaft extending at one end into an outer spiral thread, while defining a cylindrical recess that extends into the shaft;
   (b) a sector defined by the shaft communicating with the recess, the shaft also defining a protuberance as a first eccentric member;
   (c) a control shaft residing in the cylindrical recess and extending beyond said end as a spirally threaded shaft;
   (d) a movable control sleeve having an inner surface defining a spirally threaded major bore stepping into a spirally threaded minor bore, the threaded major bore threadingly mating with the outer spiral thread of the main shaft and the minor bore threading mating with the spiral threaded control shaft whereby axial movement of the sleeve along the shafts changes, relatively, the angular position of the shafts;
   (e) a second eccentric member mating with and mounted to travel relative to first eccentric member; and,
   (f) means for communicating the relative angular position of the shafts through the sector and to responsively locate the relative angular positions of the eccentric members in response thereto irrespective of the angular velocity of the main drive shaft.

2. A dynamically variable throw eccentric comprising:
   (a) a main drive shaft having a first fixed eccentric member, the shaft extending at one end into an outer spiral thread, while defining a cylindrical recess that extends into the shaft;
   (b) a sector defined by the shaft communicating with the recess the shaft also defining a protuberance as a first eccentric member;
   (c) a control shaft residing in the cylindrical recess and extending beyond said end as a spirally threaded shaft;
   (d) a movable control sleeve having an inner surface defining a spirally threaded major bore stepping into a spirally threaded minor bore, the threaded major bore threadingly mating with the outer spiral thread of the main shaft and the minor bore threadingly mating with the spiral threaded control shaft whereby axial movement of the sleeve along the shafts changes, relatively, the angular position of the shafts;

(e) an outer eccentric member mating with and mounted to circumferentially travel over the first eccentric member; and, (f) means for communicating the relative angular position of the shafts through the sector and to responsively locate the relative angular positions of the eccentric members in response thereto irrespective of the angular velocity of the main drive shaft.

3. The eccentric as claimed in claim 2 wherein the outer spiral thread of the main drive shaft, and the spirally threaded shaft of the control shaft are in opposite directions.

4. The eccentric as claimed in claim 3 wherein the pitch of the spiral threads is in the range of one revolution to 4 cm. through 15 cm of travel.

5. The eccentric as claimed in claim 2, 3 or 4 wherein the control shaft includes a rack formed over the surface of the control shaft at a position in registry with the sector, a rack mounted on the inside surface of the outer eccentric member and a pinion gear mounted in the main drive shaft extending across the sector engaging the racks to thereby relatively position, in response to the angular position of the control shaft relative to the drive shaft, the outer eccentric member on the inner eccentric member.

6. The eccentric as claimed in claim 2, 3 or 4 wherein the control shaft includes a rack formed over the surface of the control shaft at a position in registry with the sector, a rack mounted on the inside surface of the outer eccentric member and a pinion gear mounted in the main drive shaft extending across the sector engaging the racks and adapted thereby to relatively position, in response to the angular position of the control shaft relative to the drive shaft, the outer eccentric member on the inner eccentric member, the width of the racks and pinion gear being less than the width of the outer eccentric member.

7. The eccentric as claimed in claim 2, 3 or 4 wherein the cylindrical recess is coaxial to the drive shaft and the control shaft includes a rack formed over the surface of the control shaft at a position in registry with the sector, a rack mounted on the inside surface of the outer eccentric member and a pinion gear mounted in the main drive shaft extending across the sector engaging the racks and adapted thereby to relatively position, in response to the angular position of the control shaft relative to the drive shaft, the outer eccentric member on the inner eccentric member, the width of the racks and pinion gear being less than the width of the outer eccentric member.

8. A method of continuously and dynamically varying the eccentricity of a rotating member that carries a first fixed eccentric member as a protuberance thereon comprising the steps of:

(a) arranging an outer eccentric member to have an outer surface to surround the fixed eccentric member and an inner surface to matingly travel thereover;

(b) providing, a recess interior of said fixed eccentric and a sector that communicates the recess to the inner surface of the outer eccentric;

(c) providing a shaft in said recess adapted to rotate therein relative to the fixed eccentric;

(d) providing means in the sector for translating the relative angular position of the shaft to an angular position of the outer eccentric relative the fixed eccentric;

(e) imparting an angular velocity to the rotating member; then, (f) rotating the shaft to change the relative angular positions of the eccentric members, and hence, the relative angular location of the outer surface whereby an imaginary point thereon traces during each revolution of the rotating member a path of an ellipse whose eccentricity is unique and whose path of travel is orthogonal to the axis of revolution for each relative position of the eccentric members.

9. A method of varying dynamically the eccentricity of a rotating member that carries a first fixed eccentric member as a protuberance thereon comprising the steps of:

(a) arranging an outer eccentric member to have an outer surface to surround the fixed eccentric member and an inner surface to matingly travel thereover, the inner surface disposing a gear region; providing a recess interior of said (b) rotating member subjacent the outer eccentric, the recess communicating through a segment of said rotating member to the said outer eccentric;

(c) providing a rotable gear means in said segment;

(d) providing a shaft in said recess with a gear surface located to mate with said gear means;

(e) imparting an angular velocity to the rotating member; then, (f) changing the relative angular positions of the eccentric members by rotating the shaft and hence the rotatable gear means and the outer eccentric member relative the shaft, to change thereby the relative angular location of the outer surface whereby an imaginary point thereon traces during each revolution of the rotating member a path of an ellipse whose eccentricity is unique and whose path of travel is orthogonal to the axis of revolution for each relative position of the eccentric members.

10. The method as claimed in claim 8 or 9 wherein the shaft is mounted to turn about an axis of rotation that is coincident to that of the rotating member.

* * * * *